United States Patent Office

3,565,754
Patented Feb. 23, 1971

3,565,754
METHOD OF INCREASING THE WET
STRENGTH OF PAPER
Norman W. Dachs, Buffalo, and George M. Wagner, Lewiston, N.Y., assignors to Hooker Chemical Corporation, Niagara Falls, N.Y., a corporation of New York
No Drawing. Filed Dec. 30, 1968, Ser. No. 788,074
Int. Cl. D21h 3/36
U.S. Cl. 162—164
5 Claims

ABSTRACT OF THE DISCLOSURE

A process for preparing wet-strength paper wherein the paper is treated with a cationic thermosetting resin comprised of a water-soluble reaction product of epichlorohydrin and a polyamide. The polyamide is the reaction product of a nitrilotriacetic acid and a polyalkylene polyamine containing two primary amine groups and at least one secondary amine group, the amount of reactants and temperature and time of reaction being as follows: an amount of nitrilotriacetic acid sufficient to react completely with the primary amine groups of the polyalkylene polyamine reactant, but insufficient to react substantially with the secondary amine groups; the reaction carried out at 25–50° C. and for 1–3 hours when carried out at atmospheric pressure.

---

This invention relates to an improved method of increasing the wet strength properties of cellulosic products and to the cellulosic products produced thereby.

It is quite well known in the art to treat cellulosic materials, such as paper and paper pulp prior to or following the formation of sheets, with certain organic addition agents to improve the wet strength properties of the resulting cellulosic products.

By the term "paper," it is intended to include those substances which are made in relatively thin sheets or leaves from rags, straw, wood or other fibrous, cellulosic material. Wet strength paper is paper which has been treated during its manufacture so that it retains a considerable portion of its dry strength when saturated with water. Papers which have wet strengths greater than about 15 percent of their dry strengths are considered to be wet strength papers.

An object of the present invention is the provision of water soluble cationic thermosetting resins which may be employed to impart high wet strength properties to paper and paper pulp.

Another object of the present invention is the provision of water-soluble cationic thermosetting resins which are highly substantive to cellulosic fibers whereby relatively small amounts are required to produce satisfactory wet strength in paper and paper pulp.

The above and objects are accomplished by the treatment of cellulosic materials with a cationic thermosetting resin produced by the reaction of epichlorohydrin and a polyamide derived from a polyalkylene polyamine and nitrilotriacetic acids or monoamidic derivatives of nitrilotriacetic acid.

In the preparation of the resinous products of the present invention, the nitrilotriacetic acid is initially reacted with the polyalkylene polyamine, preferably in aqueous solution under conditions such as will produce a water-soluble long-chain polyamide containing the recurring groups:

wherein $n$, $x$ and $y$ are each 2 or more. The long chain polyamide of nitrilotriacetic acid is then reacted with epichlorohydrin to form the water-soluble cationic thermosetting resins which are employed in imparting wet strength to cellulosic materials.

A variety of polyalkylene polyamines including polyethylene polyamines, polypropylene polyamines, polybutylene polyamines and the like may be employed of which the polyethylene polyamines represent an economically preferred class. More specifically, the polyalkylene polyamines to be reacted with nitrilotriacetic acid are those polyamines containing two primary amine groups and at least one secondary amine group in which the nitrogen atoms are linked together by groups having the formula $-C_nH_{2n}-$ wherein $n$ is a small integer generally having a value of 2 and the number of such groups in the molecule ranges from two up to about 10 and preferably up to six. The nitrogen atoms may be attached to adjacent carbon atoms in the group $-C_nH_{2n}-$ or to carbon atoms further apart, but not to the same carbon atom.

The term "polyalkylene polyamine" herein employed refers to any of the polyalkylene polyamines which fall into the class described herein before, as well as mixtures of such polyalkylene polyamines.

Minor portions of the polyalkylene polyamine may be replaced with aliphatic diamines such as ethylene diamine, propylene diamine and the like, if desired, in order to vary the reactivity of the epichlorohydrin-polyamide. Generally, not more than about 50 mole percent based on total amines should be employed.

In carrying out the reaction between the nitrilotriacetic acid and the polyalkylene polyamine, preferably an amount of nitrilotriacetic acid sufficient to react completely with the primary amine groups of the polyalkylene polyamine reactant, but insufficient to react substantially with the secondary amine groups. This will require that usually a mole ratio of polyalkylene polyamine to nitrilotriacetic acid from about 0.3 to about 0.8, and preferably from about 0.5 to about 0.6, be employed to produce polyamides which, when reacted with epichlorohydrin, results in resins imparting high wet strength to cellulosic materials.

The reaction between the polyalkylene polyamine and nitrilotriacetic acid can be effected at temperatures on the order of from about 25 to about 50 degrees centigrade at atmospheric pressure. Temperatures on the order of from about 30 to about 40 degrees centigrade are most preferred for effecting the amidation reaction. Where reduced pressures are employed, lower temperatures may be utilized. The time required to effect reaction is dependent on the temperatures and pressures employed, ordinarily consuming from about 1 to about 3 hours.

In converting the polyamide to a cationic thermosetting resin, the polyamide is reacted with epichlorohydrin at a temperature of from about 50 to about 100 degrees centigrade, preferably between about 50 and about 80 degrees centigrade, for a period of from about 0.5 to about 1.5 (hours). Preferably, the reaction is conducted in aqueous solution.

In producing the resins, sufficient epichlorohydrin is used to convert all of the secondary amine groups to tertiary amine groups and/or quaternary ammonium groups. However, more or less epichlorohydrin may be employed to either moderate or to increase the rates of reaction. In general, from about 0.5 to about 1.8 moles of epichlorohydrin per mole of secondary amine group is employed in the reaction. Preferably, from about 0.8 mole to about 1.5 moles of epichlorohydrin per mole of polyamide secondary amino group is employed.

Following completion of the epichlorohydrin polyamide reaction, sufficient water is added to the reaction mixture to adjust the solids content to about 10 percent by weight or less. The product is then cooled and sufficient acid is added to adjust the pH to from about 4.5 to about 5.5. Suitable acids for pH adjustment include hydrochloric, sulfuric, nitric, acetic and the like.

The nitrilotriacetic acid based polyamide epichlorohydrin resins can be incorporated into cellulosic pulp slurry at the wet end of the paper machine. Addition may also be effected from tub sizes or at a size press or from showers to dried or partially dried cellulosic sheeting.

For most purposes, adequate wet strength may be effected by incorporating in the paper or pulp from about 0.3 to about 3.0 percent of the resin based on the dry weight of the pulp. Preferably, from about 0.5 to about 1.0 percent by weight of the resin is employed.

Unbleached, unsized kraft sheets were treated at the size press with these solutions. The treated paper was then dried 2 minutes at 120 degrees centigrade and 1.4–3.8 percent, based on dry weight of the polyamide epichlorohydrin resin, was added. The sheets were cured for 1 hour at 120 degrees centigrade. The results are listed in Table 1.

TABLE 1

|  | Untreated | Solution 1 | Solution 2 | Solution 3 | Solution 4 |
| --- | --- | --- | --- | --- | --- |
| Resin of Example 1, g | * | 5.26 | 10.58 | 21.1 | 31.6 |
| Water, g | * | 94.74 | 89.4 | 78.9 | 68.4 |
| Percent resin addition | * | 1.37 | 1.8 | 2.9 | 3.8 |
| Burst, dry | 38.0 | 43.0 | 48.5 | 49.5 | 49.5 |
| Percent retained | 11.85 | 26.7 | 28.8 | 36.3 | 36.3 |
| Tensile, dry | 28 | 37.5 | 35.5 | 39.0 | 34.0 |
| Percent retained | 2.85 | 16.8 | 22.2 | 25.8 | 33.2 |
| Stiffness, dry | 200 | 218 | 209 | 226 | 258 |
| Percent retained | 21.1 | 33.6 | 28.7 | 31.4 | 28.4 |

EXAMPLE 2

E. B. Riegl unbleached kraft pulp was mixed with water to a consistency of 1.5% and beaten to a Canadian standard freeness of 450 ml. After beating, the slurry was diluted to 0.5% consistency and divided into 300 ml. aliquots. Each aliquot was used to make a 6.812 in diameter hand sheet as described in T.A.P.P.I. Method No. T-205-M-58.

The resin produced according to Example 1 was diluted with water and a portion of the dilute solution added to the pulp slurry the amount of resin solution added was chosen to provide 0.5, 1.0, 2.0 and 3.0% of resin solids based on weight of dry pulp.

The sheets were dried on a hot press for 30 seconds and cured 1 hour at 250 degrees Fahrenheit in a forced air oven.

The handsheets were tested for wet strengths and compared to control sheets prepared in similar manner as previously.

TABLE 2

|  | Untreated | Solution 1 | Solution 2 | Solution 3 | Solution 4 |
| --- | --- | --- | --- | --- | --- |
| Resin of Example 1 |  | 0.52 | 1.04 | 2.35 | 3.15 |
| $H_2O$ |  | 10.0 | 10.0 | 10.0 | 10.0 |
| Percent resin addition |  | 0.5 | 1.0 | 2.0 | 3.0 |
| Burst, dry | 46.0 | 50.3 | 53.5 | 60.0 | 48.8 |
| Percent retained | 10.85 | 34.8 | 35.5 | 45.0 | 52.2 |

The following examples will illustrate the present invention.

EXAMPLE 1

One hundred ninety one grams (1.0 mole) of nitrilotriacetic acid, 620 grams (10 moles) of ethylene glycol and 0.5 gram of para-toluene sulfonic acid was placed in a liter-3-necked flask equipped with mechanical stirrer, thermometer and a reflux condenser fitted with a Dean Stark trap, and heated at 185 to 190 degrees centigrade for 3 hours. One-half of the mixture was diluted with 100 milliliters of ethylene glycol and to it was added dropwise over a period of 10 minutes 51.5 grams (0.5 mole) diethylene triamine. The solution was then cooled, as necessary, to stabilize the exothermic reaction at 30–35 degrees centigrade.

Fifty-two and sixth-tenths grams of the resulting polyamide was heated, following the addition of 128.1 grams of water, to 80–90 degrees centigrade, cooled to 50 degrees centigrade and 9.2 grams (0.1 mole) of epichlorohydrin was added dropwise over a period of 10 minutes. Following the addition, the reaction mixture was heated at 70–80 degrees centigrade for a period of 45 minutes. An amber solution was obtained on cooling containing 9.2 percent solids of epoxidized polyamide. This solution was diluted to varying concentrations and the pH adjusted to 4.5–5.0.

It is thus readily seen that the water soluble cationic thermosetting resins of the present invention are highly effective as wet-strength resins for cellulosic materials.

While preferred embodiments of the present invention have been described, the invention is not to be construed as limited thereby.

What is claimed is:

1. A process for preparing wet-strength paper which comprises incorporating therein from about 0.3 to about 3.0 percent by weight, based on the dry weight of paper, of a cationic thermosetting resin comprising a water-soluble reaction product of epichlorohydrin and a polyamide resulting from the reaction of (a) nitrilotriacetic acid and (b) a polyalkylene polyamine containing two primary amine groups and at last one secondary amine group, the mole ratio of polyamine to nitrilotriacetic acid being from 0.3–0.8 to 1.0 and the reaction of the polyalkylene polyamine and the nitrilotriacetic acid being carried out at the temperature of from 25–50° C. for from 1–3 hours when the reaction is carried out at atmospheric pressure.

2. A process as claimed in claim 1 wherein the polyalkylene polyamine is diethylene triamine.

3. A process as claimed in claim 1 wherein the polyalkylene polyamine is triethylene tetramine.

4. A paper product having improved wet strength comprising sheeted cellulosic fibers containing from about 0.3 to about 3.0 percent by weight, based on the weight of dry fibers, of a cationic thermosetting resin, said resin comprising a water-soluble reaction product of epichlorohydrin and a polyamide resulting from the reaction of (a) nitrilotriacetic acid and (b) a polyalkylene polyamine containing two primary amine groups and at least one secondary amine group, the mole ratio of polyamine to nitrilotriacetic acid being from 0.3–0.8 to 1.0 and the reaction of the polyalkylene polyamine and the nitrilotriacetic acid being carried out at the temperature of from 25–50° C. for from 1–3 hours when the reaction is carried out at atmospheric pressure.

5. A paper product as claimed in claim 4 wherein the resin is incorporated therein in an amount of from about 0.5 to about 1.0 percent by weight.

References Cited

UNITED STATES PATENTS

| | | | |
|---|---|---|---|
| 2,926,116 | 2/1960 | Keim | 162—164 |
| 3,513,127 | 5/1970 | Marans | 260—78A |

S. LEON BASHORE, Primary Examiner

R. H. ANDERSON, Assistant Examiner

U.S. Cl. X.R.

162—168; 260—78